US006900815B2

(12) United States Patent
Yoshioka

(10) Patent No.: US 6,900,815 B2

(45) Date of Patent: May 31, 2005

(54) IMAGE DATA STORAGE METHOD

(75) Inventor: Kenji Yoshioka, Tokyo (JP)

(73) Assignee: NEC Corporation, Tokyo (JP)

(*) Notice: Subject to any disclaimer, the term of this patent is extended or adjusted under 35 U.S.C. 154(b) by 630 days.

(21) Appl. No.: 09/971,598

(22) Filed: Oct. 9, 2001

(65) Prior Publication Data

US 2002/0047850 A1 Apr. 25, 2002

(30) Foreign Application Priority Data

Oct. 23, 2000 (JP) ....................................... 2000-322989

(51) Int. Cl.[7] ............................ G09G 5/00; G06F 12/02

(52) U.S. Cl. ....................... 345/600; 345/542; 345/543; 345/547; 345/589; 711/170; 711/171

(58) Field of Search ................................ 345/541–547, 345/549, 589, 597, 600, 643, 581, 22, 555; 711/170–173

(56) References Cited

U.S. PATENT DOCUMENTS

| | | | | |
|---|---|---|---|---|
| 5,638,190 A | | 6/1997 | Geist | |
| 6,016,535 A | * | 1/2000 | Krantz et al. | 711/171 |
| 6,124,945 A | * | 9/2000 | Ishihara et al. | 358/1.9 |
| 2002/0031271 A1 | * | 3/2002 | Kuroda et al. | 382/233 |

FOREIGN PATENT DOCUMENTS

| | | |
|---|---|---|
| EP | 0 256 816 A1 | 8/1987 |
| EP | 0 319 684 A3 | 6/1989 |
| GB | 2 186 765 A | 8/1987 |
| JP | 10-28269 | 1/1998 |
| JP | 10-200715 | 7/1998 |
| JP | 11-27626 | 1/1999 |
| JP | 11-250009 | 9/1999 |
| JP | 11-345201 | 12/1999 |
| JP | 2000-115253 | 4/2000 |
| JP | 2000-172609 | 6/2000 |

OTHER PUBLICATIONS

British Search Report dated May 27, 2002.

United Kingdom Examination Report dated May 25, 2004.

Chinese Office Action dated Aug. 1, 2003, with English translation.

Japanese Office Action dated May 12, 2004 with Partial English Translation.

* cited by examiner

*Primary Examiner*—Matthew C. Bella
*Assistant Examiner*—Wesner Sajous
(74) *Attorney, Agent, or Firm*—McGinn & Gibb, PLLC

(57) ABSTRACT

If a user wants to store an image acquired from a site and it is determined that the data size of the image acquired from the site is larger than a designated storage frame in a memory region, then it is determined whether or not the number of colors in the pallet of the acquired image data can be reduced. Next, if the number of pallet colors can be reduced, the number of pallet colors is reduced to thereby compress the pallet and the image data is updated based on the compressed pallet. On the other hand, if it is determined that the number of pallet colors cannot be reduced, a control section determines that the image data cannot be registered or stored and abandons the data and a display section displays storage error.

7 Claims, 10 Drawing Sheets

IMAGE DATA STORAGE METHOD

BACKGROUND OF THE INVENTION

1. Technical Field of the Invention

The present invention relates to a method for registering or storing image data, acquired from a website or the like using a mobile terminal having internet connecting function such as a cellular phone, a personal handyphone system (PHS), or a portable information terminal, in the memory region of the mobile terminal, and particularly relates to an image data storage method changing color data on image data acquired and the size of the image data on a screen in accordance with the vacant state of the memory region.

2. Description of the Prior Art

Mobile terminals having Internet connecting function, such as a cellular phone, a PHS and a personal digital assistant (PDA) having communication function are becoming standard mobile terminals. It is, therefore, possible to capture and display an image and to register the image as in the case of doing them on a personal computer (PC).

The memory capacity of a mobile terminal is, however, far smaller than that of a PC due to various restrictions in relation to packaging and cost, making a region secured for the storage of image data limited.

According to JP 11-345201 A (1999), for example, a communication control section on a network discriminates the display capacity of a cellular phone and then displays information for exactly one image plane on the browser of the cellular phone for each time registered or stored in advance. Here, a relay computer connects with the cellular phone using an identification number and a password and transmits information designated by the cellular phone over a telecommunication line.

Also, according to JP 2000-115253 A, a data packet is transmitted to a radio portable terminal, voice is outputted from a voice output device built in the radio portable terminal, and a small-sized image is displayed on a built-in display or registered or stored in a built-in memory. On the other hand, a large-sized image is transferred to a portable notebook size calculator or the like.

Generally, the display section of a cellular phone or the like is far smaller than that of a personal computer and the number of colors which can be displayed on the display section is still small despite recent development in color display.

Therefore, if an image is acquired from an ordinary site, a conventional cellular phone or the like processes image data in accordance with the capabilities of the portable terminal including the number of colors and display size of the portable terminal, and then displays the image. If registering or storing the image, however, the acquired data is registered or stored as it is, causing a problem that all the data cannot be registered or stored due to lack of memory capacity.

SUMMARY OF THE INVENTION

An object of the present invention to change the pallet and size of acquired image data depending on a state in which a memory is used and to thereby register the entire image.

The image data storage method of the present invention by using a portable terminal including display means for displaying an image and a memory storing image data, the memory including a plurality of image data storage frames each having an equal storage capacity, the method comprising the steps of determining whether the image data acquired by the portable terminal is larger than each of the storage frames; determining whether the number of pallet colors of the image data is larger than a predetermined threshold value if the image data is larger than the storage frame; reducing the number of pallet colors of the image data if the number of pallet colors of the image data is larger than the predetermined threshold value; and updating the image data based on the color-reduced pallets, and wherein if a size of the updated image data is equal to or smaller than the storage capacity, the updated image data is registered or stored in the storage frames.

Also, the image data storage method of the present invention by using a portable terminal including display means for displaying an image and a memory including a storage region storing image data and a temporary region temporarily storing the image data, comprising the steps of: determining whether the number of pallet colors of the image data is larger than a predetermined threshold value if the image data acquired by the portable terminal is larger than a capacity of a vacant region of the storage region; storing the image data acquired by the portable terminal in the temporary region if the number of pallet colors of the image data is equal to or smaller than the predetermined threshold value; and reducing the number of pallet colors of other image data stored in the storage region, and increasing the storage capacity of the vacant region, and wherein if the image data stored in the temporary region becomes equal to or smaller than the capacity of the vacant region, the image data is registered or stored in the vacant region of the storage region.

According to the present invention stated so far, even if the data size of image data acquired from an Internet website or the like exceeds the size of a designated memory region, the image data can be registered or stored in the memory by subjecting the image data to a minimum reduction processing. Accordingly, it is possible to ensure registering the image data in the memory of a portable terminal without wasting time and communication fee required for the acquisition of the image data.

PREFERRED EMBODIMENT OF THE INVENTION

Figure 1:
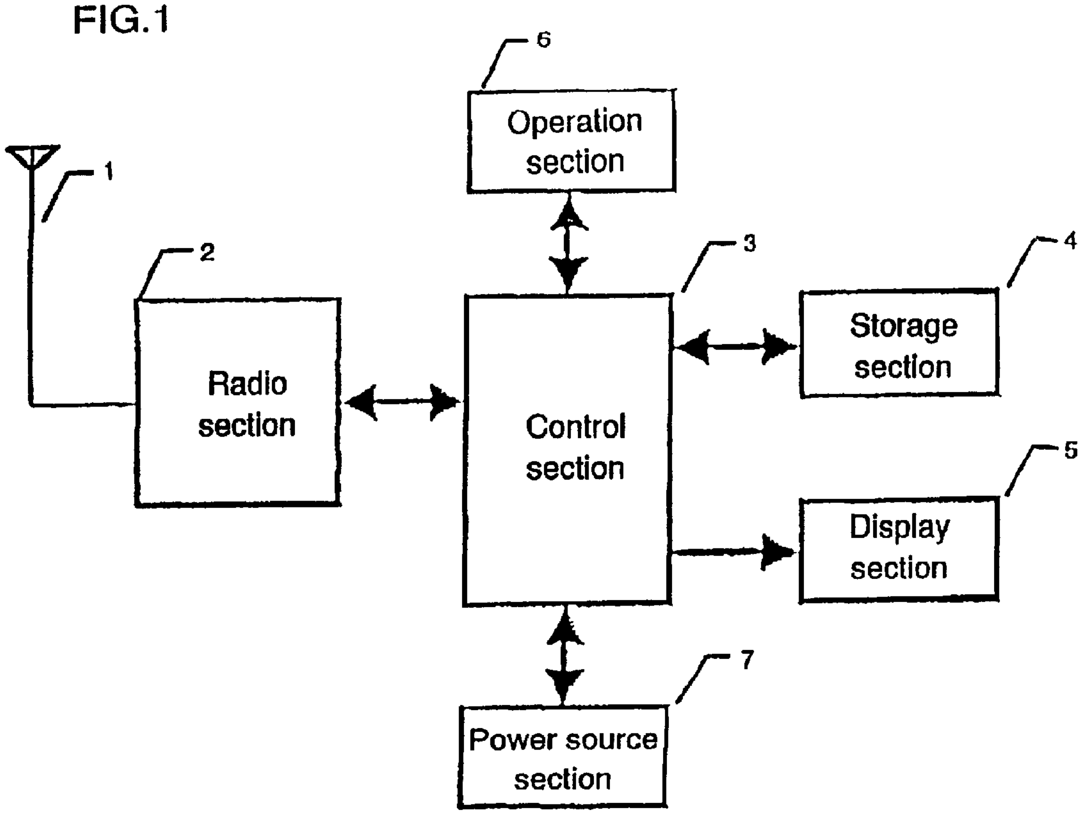
FIG. 1 is a block diagram of a mobile terminal used for an image data storage method according to the present invention.

FIG. 1 is a block diagram of a portable terminal, such as a cellular phone or a personal handyphone system, used for an image data storage method according to the present invention.

An antenna 1 receives a radio wave, and a radio section 2 subjects a received high frequency radio signal to frequency conversion, noise reduction and demodulation. A control section 3 decodes the demodulated digital signal and converts the decoded signal into image data. An operation section 6 issues an instruction to register an image acquired from an Internet website or the like in a storage section 4. A power source section 7 supplies power to the respective sections.

To be specific, the control section 3 compares the size of the acquired image data with the vacant region of a memory. In addition, the control section 3 refers to pallet information and image size information on the acquired image. Also, the control section 3 performs a determination processing as to whether it is possible to reduce the number of colors of the acquired data, i.e., to reduce the pallet. Further, the control section 3 performs a determination processing as to whether the acquired image data can be resized. Further, the control section 3 performs a processing for reducing the number of pallet colors of the image data. Further, the control section 3 performs a resize processing for changing the size of the image data. Further, the control section 3 performs an image data update processing based on the reduced number of pallet colors. Further, the control section 3 performs an image data update processing based the resized image data. Further, the control section 3 compares the number of pallet colors of the image data with an internal threshold value. Further, the control section 3 compares the image size of the image data with an internal threshold value. Further, the control section 3 registers the image data in a designated storage frame in a memory region or registers the image data in a temporary region used to temporarily register image data. Further, the control section 3 performs a detection processing as to whether image data has been registered or stored in the memory.

The storage section 4 registers the image data. Alternatively, the storage section 4 has a temporary storage region. Alternatively, the storage section 4 registers internal threshold value data on the number of pallet colors and internal threshold value data on the image size.

The display section 5 displays the acquired image. Alternatively, the display section 5 displays that the image data has been registered or stored in the memory. Alternatively, the display section 5 displays that the image data has been abandoned.

[Embodiment 1]

If image data is acquired from a site, the display section 5 displays the acquired image. If a user wants to register the acquired image, the user performs a storage operation using operation buttons prepared on the operation section 6. If the storage operation is performed, the control section 3 determines whether or not the size of the acquired image data is smaller than a designated storage frame in the memory region of the storage section 4.

Figure 2:
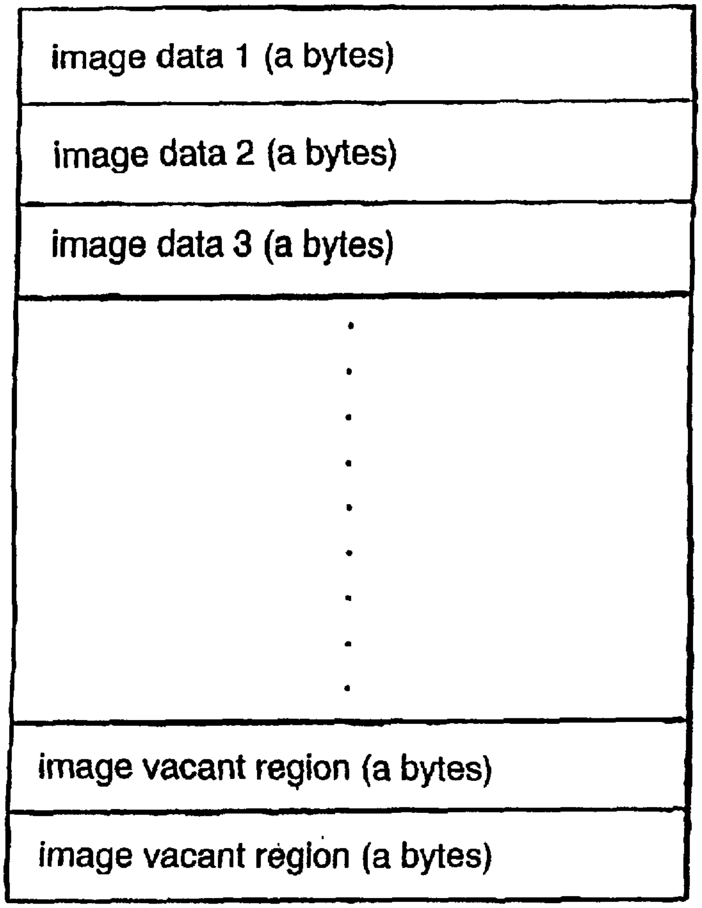
FIG. 2 shows an example of the memory management structure of the storage section of the mobile terminal.

FIG. 2 shows one example of the memory region management structure of the storage section 4 preferred for this mode for carrying out the present invention. The storage section 4 can register a plurality of images and a memory region allotted to one image has an equal size of a bytes.

Figure 3:
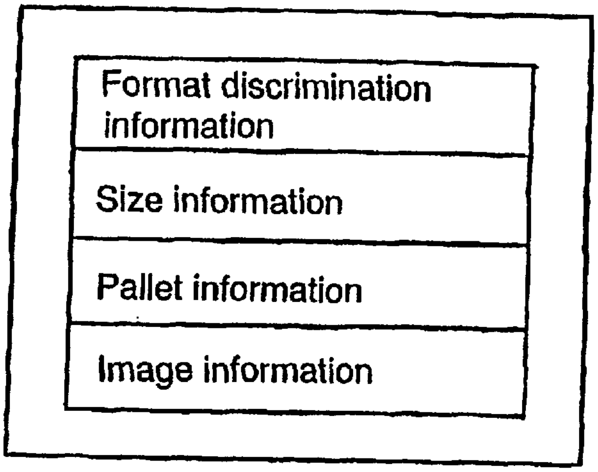
FIG. 3 shows an example of the data structure of image data.

FIG. 3 shows one example of the data constitution of image data. The image data consists of type discrimination information for discriminating an image type such as a moving image or a still image, screen size information, pallet information on colors and image information itself, i.e., image data.

Figure 4:
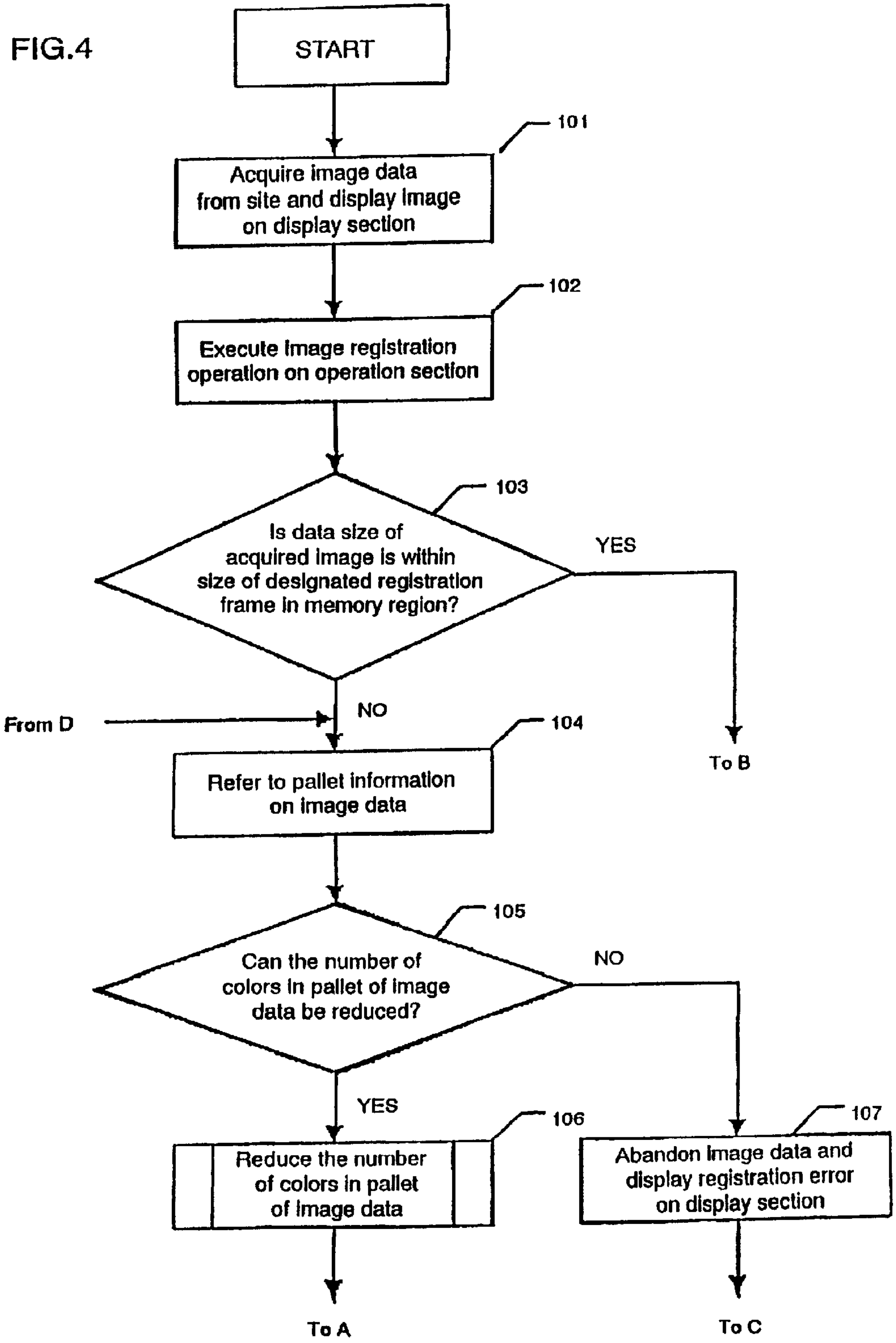
FIG. 4 is a flow chart for describing an image storage method in the first mode for carrying out the present invention.
Figure 5:
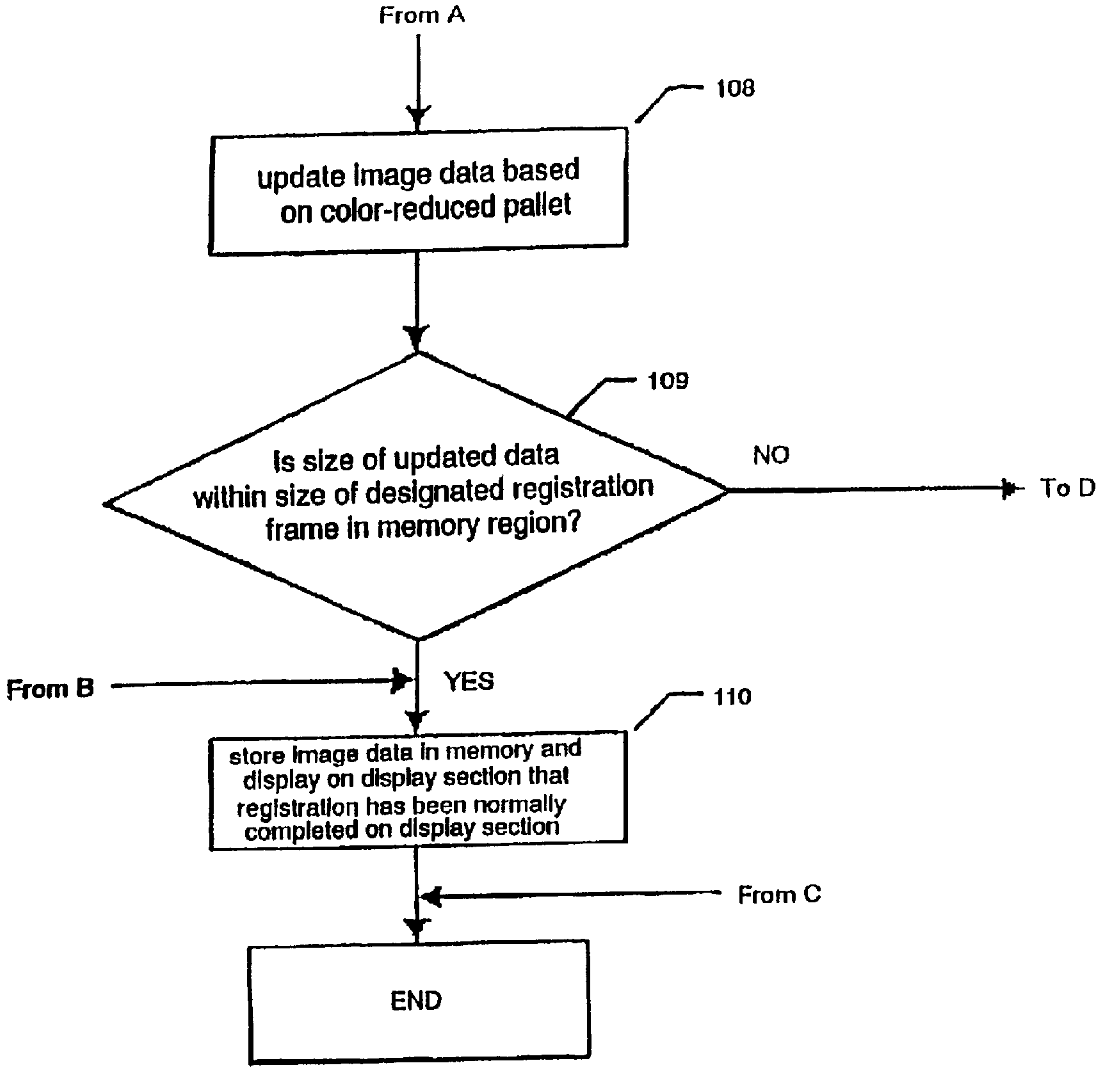
FIG. 5 is a flow chart following the flow chart of FIG. 4.

FIG. 4 is a flow chart for describing the image data storage (storage) method in the first mode for carrying out the invention. FIG. 5 is a flow chart following the flow chart of FIG. 4.

First, in a step S101, image data is acquired from a site such as an Internet website and displayed on the display section 5.

Next, in a step S102, the operation section 6 performs an image storage operation.

Next, in a step S103, it is determined whether or not the size of the acquired image data is smaller than a bytes. If it is determined that the data size is smaller than a bytes, the processing moves to a step S110. In the step S110, the control section 3 registers the data in the storage section 4 and the display section 5 displays that the data storage, that is, data storage has been normally completed.

On the other hand, if it is determined in the step S103 that the data size of the image acquired from the site is larger than a bytes, the processing moves to a step S104. In the step S104, the control section 3 refers to pallet information on the image data. Further, in a step S105, the control section 3 determines whether or not the number of pallet colors an be reduced, that is, whether or not color reduction can be made.

The pallet information is information representing display colors. The display colors ranges from 24 bits of full colors (16,770,000 colors) to 1 bit (black and white). The determination as to whether or not the number of pallet colors can be reduced is made such that if the pallet has 2 bits (4 colors) or more, color reduction can be made and if the pallet has 1 bit, color reduction cannot be made. It is noted, however, that this threshold value may be set arbitrarily between 24 bits and 2 bits.

Next, if it is determined in the step S105 that the number of pallet colors can be reduced, the processing moves to a step S106. In the step S106, the control section 3 conducts color reduction, compresses the pallet and updates the image data based on the compressed pallet. It is assumed that here that in the reduction processing, a pallet is converted into a pallet having the second largest number of colors to that of the pallet before reduction. For example, a pallet of 64 colors is converted into a pallet of 32 colors.

On the other hand, if it is determined in the step S105 that the number of pallet colors cannot be reduced, the processing moves to a step S107. In the step S107, the control section 3 determines that the image data cannot be registered or stored and abandons the data, and the display section 5 displays storage error.

Next, following the step S106, in a step S108, the image data is updated based on the color-reduced pallet.

Next, in a step S109, it is determined whether or not the size of the updated image data is smaller than the size of the designated storage frame in the memory region. If the size of the image data is smaller than the size of the designated storage frame in the memory region, the processing moves to a step S110. In the step S110, the control section 3 registers the image data in the storage section 4 and the display section 5 displays that the storage has been normally completed.

On the other hand, if it is determined in the step S109 that the image data is larger in size than the designated storage frame, the processing moves to the step S104. In the step S104, the control section 3 refers again to the pallet information on the image data. Further, in the step S105, the control section 3 determines whether or not the number of pallet colors of the image data can be reduced In this way, by repeating the color reductions, the size of the acquired image data is reduced to a suitable size and the entire image data is eventually registered or stored in the storage section 4.

[Embodiment 2]

In the second mode for carrying out the invention, a memory is dynamically managed and already registered or stored data is also subjected to a pallet color reduction processing so as to further store all the acquired image data.

Figure 6:
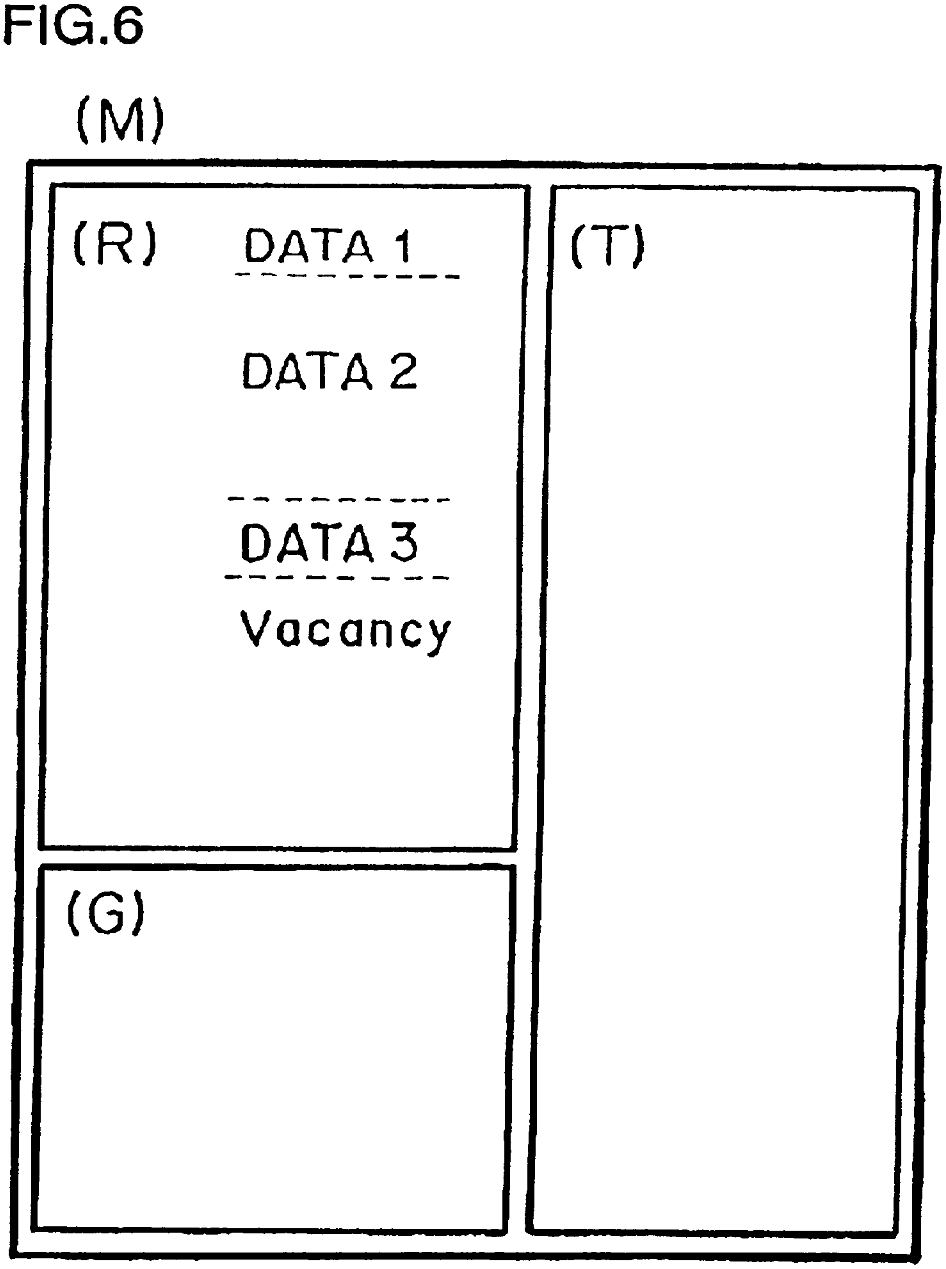
FIG. 6 shows an example of a memory management structure preferred for the second mode for carrying out the invention.

FIG. 6 shows an example of the memory constitution of a storage section 4 preferred for this mode for carrying out the invention. An entire memory M in the storage section 4 consists of a storage region R for registering or storing image data, a temporary region T for temporarily storing image data which cannot be stored in the storage region, and the other region G used for purposes other than image storage. For example, the storage region R stores image data 1, 2 and 3, and the remaining regions are vacant region V (Vacancy). In addition, the capacity of the image data 1, 2 and 3 is dependent on the quantity of data captured from an Internet website or the like and is not fixed.

Figure 7:
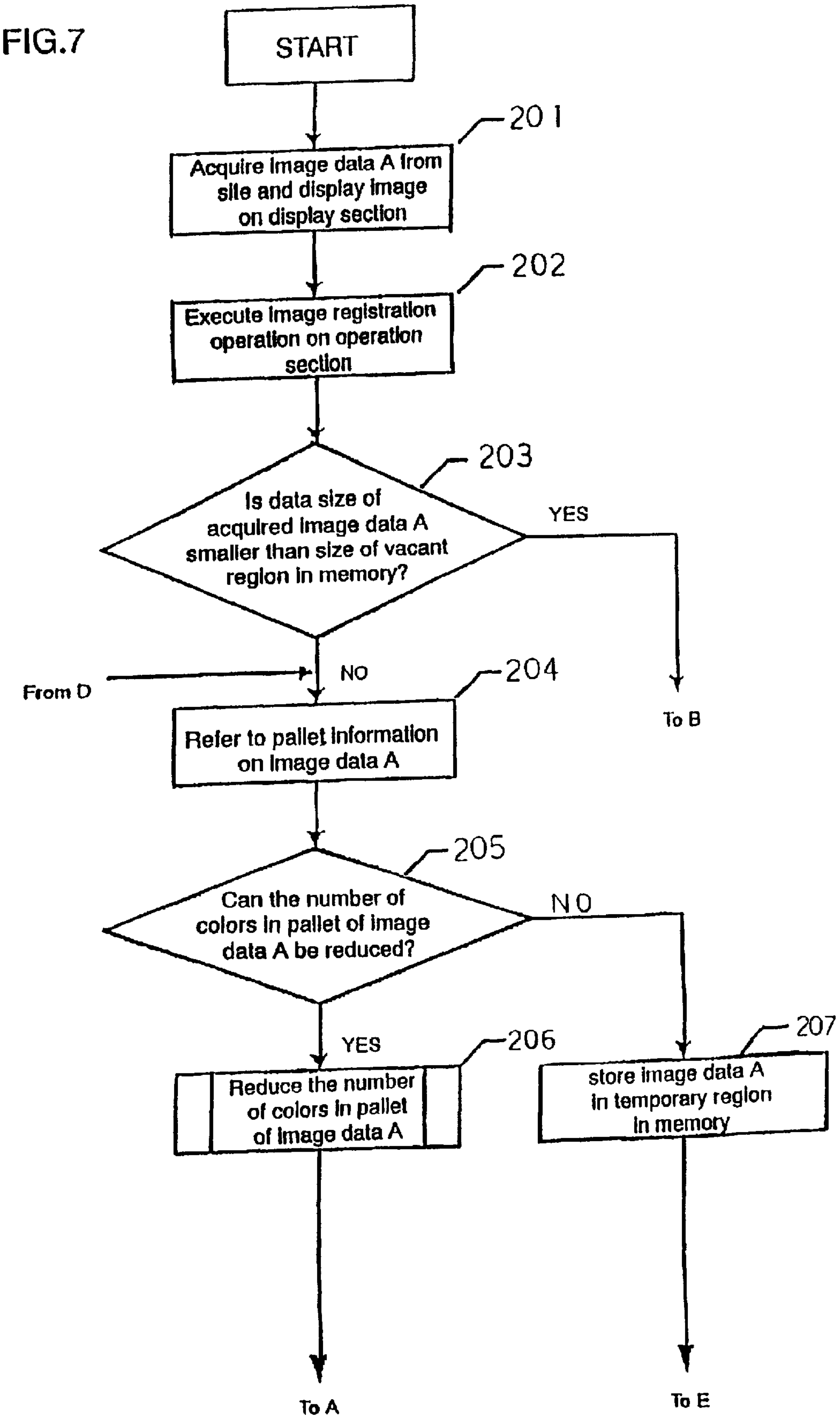
FIG. 7 is a flow chart for describing an image storage method in the second mode for carrying out the present invention.
Figure 8:
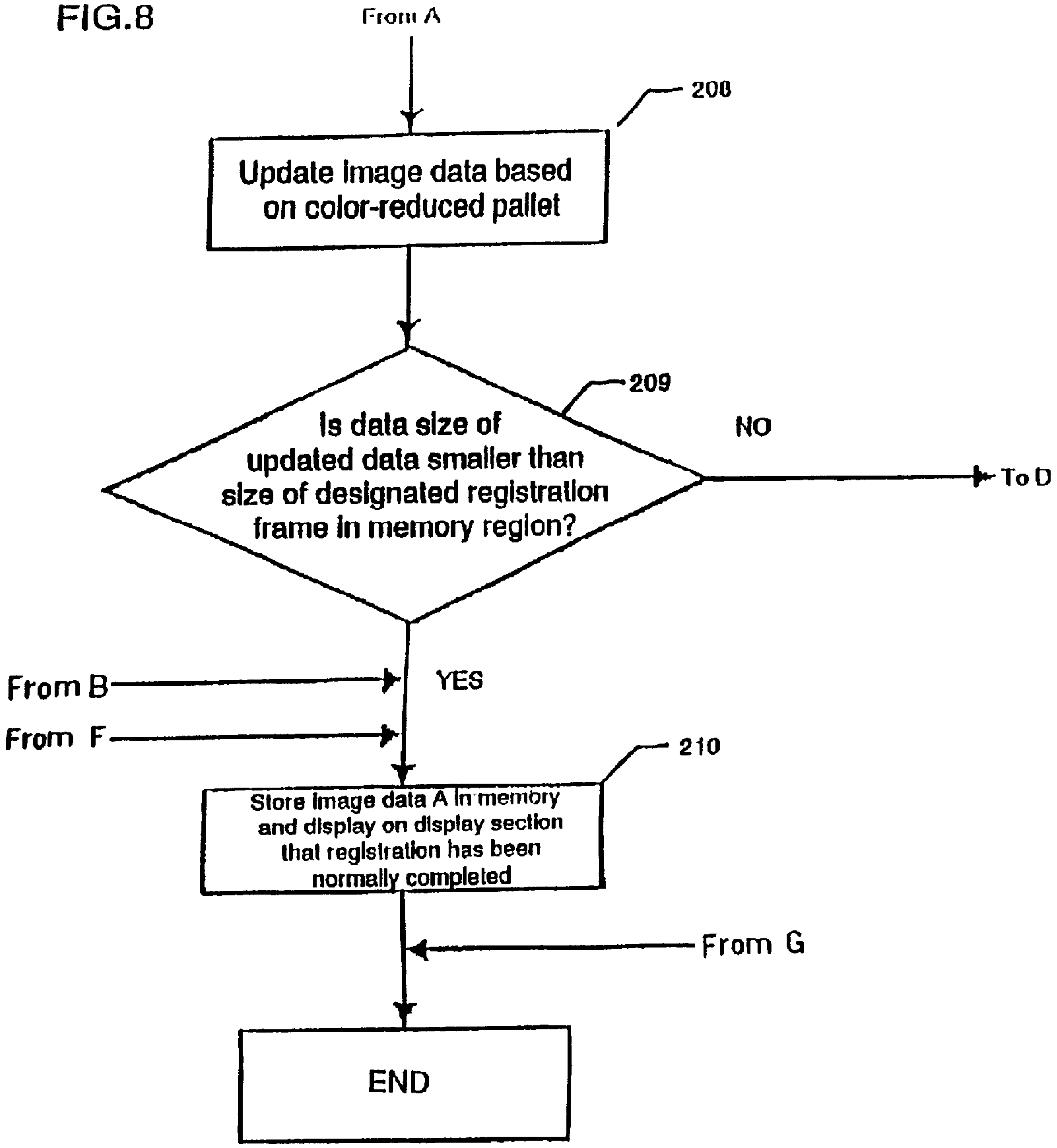
FIG. 8 is a flow chart following the flow chart of FIG. 7.
Figure 9:
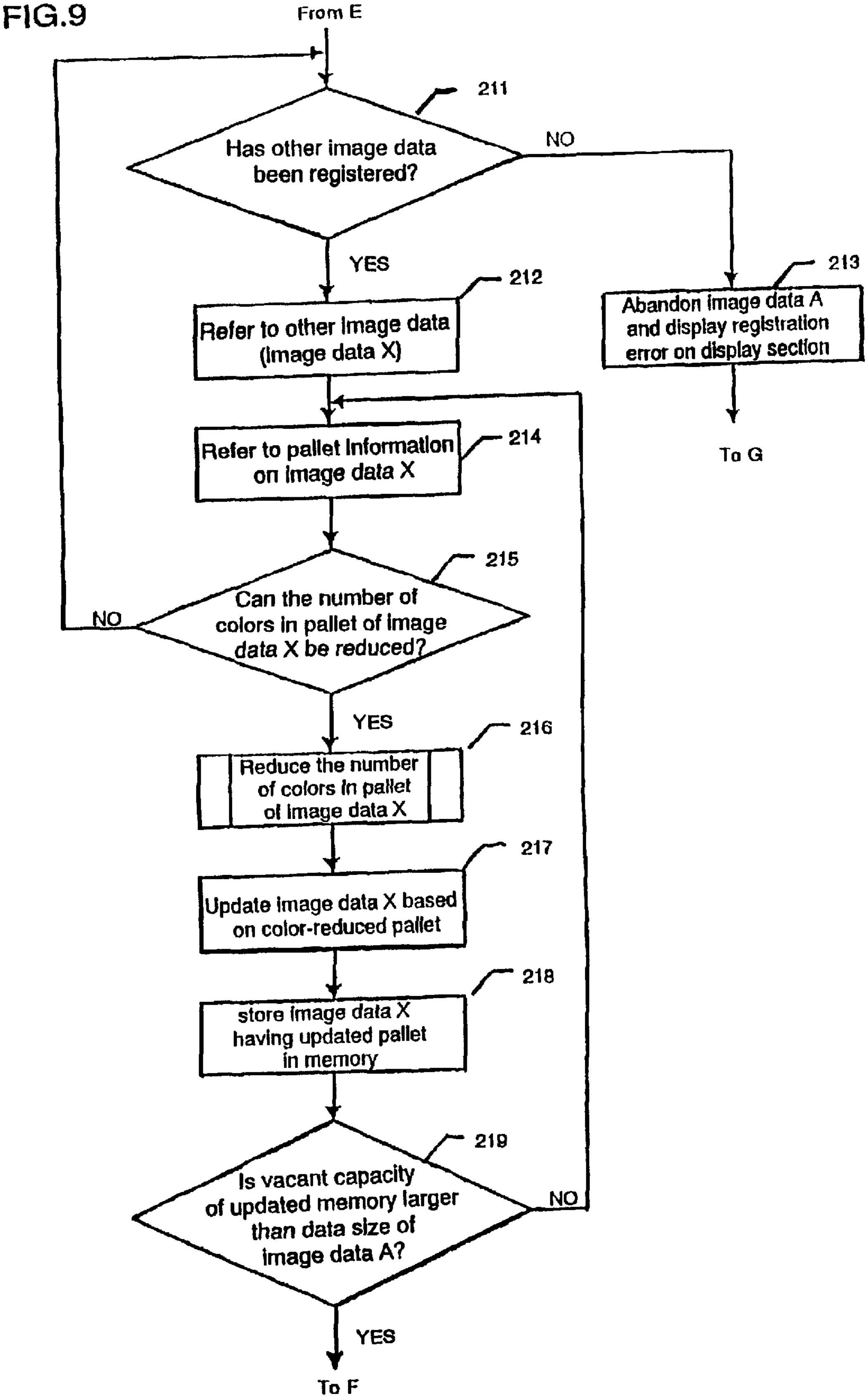
FIG. 9 is a flow chart following the flow chart of FIG. 7.

FIG. 7 is a flow chart for describing an image data storage method in the second mode for carrying out the invention. FIGS. 8 and 9 follow the flow chart of FIG. 7, respectively.

First, in a step S201, when image data is acquired from a site, the display section displays the acquired image.

Next, in a step S202, if a user wants to register the acquired image data A, the user performs a storage operation using operation buttons prepared on the operation section 6.

Next, in a step S203, the control section 3 determines whether or not the data size of the image data A is within the size of the vacant region V. If the image data A is smaller in size than the vacant region V, the processing moves to a step S210. In the step S210, the control section 3 registers the image data A in the vacant region V and the display section 5 displays that the storage has been normally completed.

On the other hand, if it is determined in the step S203 that the image data A is larger in size than the vacant region V, the processing moves to a step S204. In the step S204, the control section 3 refers to pallet information on the image data A.

Next, in a step S205, as in the case of the first mode for carrying out the invention, it is determined whether or not the pallet of the image data A can be reduced, that is, the number of colors can be reduced. If the pallet of the image data A can be reduced, the processing moves to a step S206. In the step S206, the control section 3 reduces the pallet of the image data A. Further, in a step S208, the control section 3 updates the image data A based on the reduced pallet. A pallet reduction method, i.e., a method for reducing the number of colors is the same as that in the first mode for carrying out the invention.

On the other hand, if it is determined in the step S205 that the pallet of the image data A cannot be reduced, the processing moves to a step S207. In the step S207, the control section 3 registers the image data A in the temporary region T.

In a step 211 following the step S207, it is determined whether or not image data has been registered or stored in the storage region R.

If it is determined in the step S211 that image data has not been registered or stored in the storage region R, it means that the capacity of the captured image A is larger than the entire capacity of the storage region R. Such image data A cannot be registered or stored in the storage region R in the first place. In this case, therefore, the image data A is abandoned and storage error is displayed on the display section in a step S213.

On the other hand, if it is determined in the step S211 that the other data (image data X) has been registered or stored in the storage region R, the processing moves to a step S212. In the step S212, the control section 3 refers to the image data X. Further, in a step S214, the control section 3 refers to pallet information on the image data X.

In a step S216 following the step S214, it is determined whether or not the number of colors in the pallet of the image data can be reduced. If color reduction cannot be made, the image data X is registered or stored in the storage region R and the processing returns to the step S211. In the step S211, it is determined whether or not image data other than the image data X has been registered or stored in the storage region R.

Next, in a step S216, if the number of colors in the pallet of the image data X can be reduced, the control section 3 reduces the number of colors in the pallet of the image data X. Further, in a step S217, the image data X is updated and in a step S218, the updated image data X is stored in the memory based on the color-reduced pallet. It is assumed here that in the color reduction processing, a pallet is converted into a pallet having the second largest number of colors to that of a pallet before color reduction.

Next, in a step S219, the control section 3 compares the capacity of the vacant region V which capacity has been increased by updating the other image data X based on the color-reduced pallet with the data size of the image data A stored in the temporary region T. If the data size of the image data A is larger, the processing moves to a step S210. In the step S210, the control section 3 registers the image data A in the storage region R and the display section 5 displays that storage has been normally completed.

On the other hand, if it is determined in the step S219 that the data size of the image data A is larger, the processing returns to the step S214. In the step S214, the control section 3 refers again to the pallet information on the other image data X and determines whether or not the number of colors in the pallet of the other image data can be reduced.

In this way, by repeating the color reductions even for the registered image data, it is possible to reduce the data size of the acquired image data and registered or stored image data to a suitable data size for further ensuring registering or storing the acquired image data in the storage section 4.

Meanwhile, description will be given to a case where it is determined in the step S205 that the number of colors in the pallet of the image data A can be reduced in the following step S206 and in the following step S208, the image data A is updated based on the color-reduced pallet.

In a step S209 following the step S208, it is determined whether or not the image data A updated based on the color-reduced pallet is smaller than the designated storage frame in the memory region. If the updated image data A is smaller than the designated storage frame, the processing moves to a step S210. In the step S210, the control section 3 registers the image data A in the storage section 4 and the display section 5 displays that the storage has been normally completed.

On the other hand, if it is determined in the step S209 that the updated data size is larger than the size of the designated storage frame, the processing returns to the step S204. In the step S204, the control section 3 refers again to the pallet information on the image data A. Further, in the step S205, the control section 3 determines whether or not the number of colors in the pallet of the image data A can be reduced.

In this way, by repeating the color reductions, the size of the acquired image data is reduced to a registrable data size. Finally, in the step S210, the image data is registered or stored in the storage section 4.

[Embodiment 3]

In the third mode for carrying out the invention, image size (the number of vertical and horizontal dots) is added as an element for making image data small to thereby prevent color information from being considerably lost by the reduction of the number of pallet colors.

A memory management structure preferred for the third mode for carrying out the invention is the same as that shown in FIG. 2 and a memory region allotted to one image is equal among the images.

Figure 10:
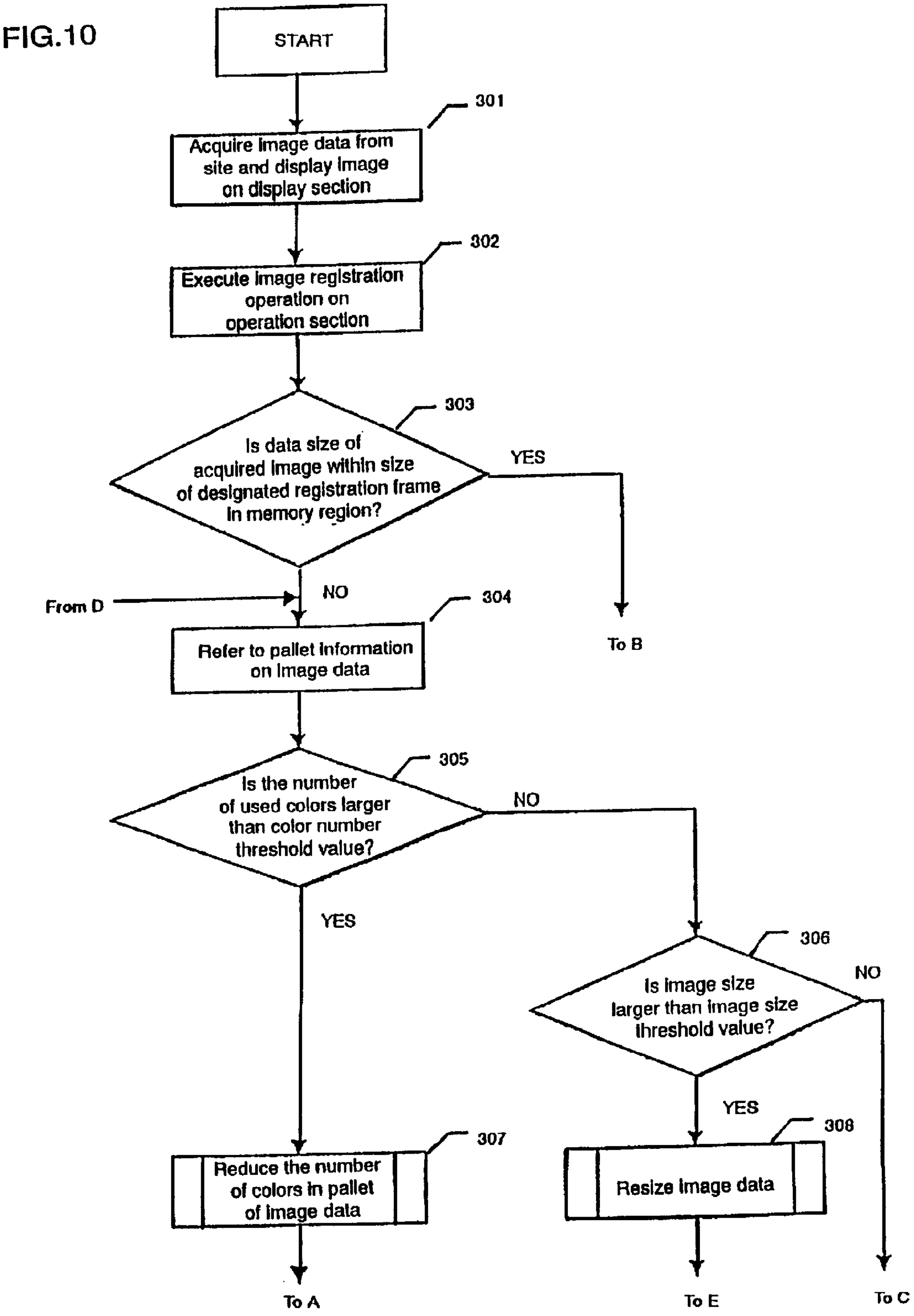
FIG. 10 is a flow chart for describing an image storage method in the third mode for carrying out the present invention.
Figure 11:
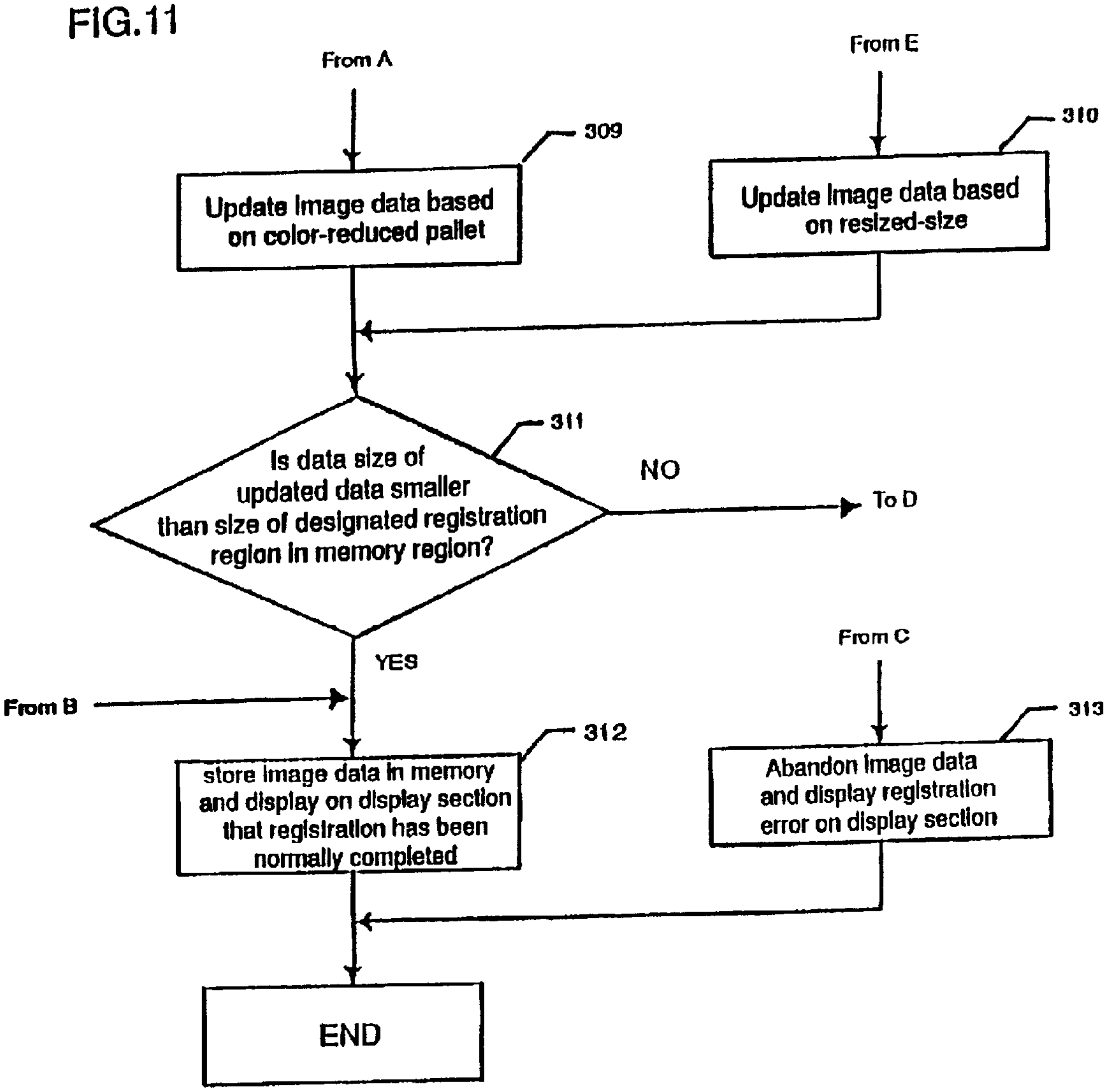
FIG. 11 is a flow chart following the flow chart of FIG. 10.

FIG. 10 is a flow chart for describing an image data storage method in the third mode for carrying out the invention. FIG. 11 follows the flow chart of FIG. 10.

First, in a step S301, when image data is acquired from a site, the acquired image is displayed on the display section 5.

Next, in a step S302, if a user wants to register the acquired image data, the user performs a storage operation using operation buttons prepared on the operation section.

Next, in a step S303, the control section 3 determines whether or not the size of the acquired image is within the size of a designated storage frame in a memory region. If the data size of the acquired image is smaller than the size of the designated storage frame in the memory region, the processing moves to a step S312. In the step S312, the control section 3 registers the image data in the storage section 4 and the display section 5 displays that the storage has been normally completed.

On the other hand, if it is determined in the step S303 that the image data is larger in size than the designated storage frame in the memory region, the processing moves to a step S304. In the step S304, the control section 3 refers to pallet information on the image data.

Next, in a step S306, it is determined whether or not the number of colors used in the image data is higher than a predetermined color number threshold value. Generally, the image data pallet has colors ranging from 24 bits of full colors (16,770,000 colors) to 1 bit (black and white). The color number threshold value is preset as internal information on a mobile terminal To prevent color information from being considerably lost, it is desirable to coincide the number of the colors to the number of colors which can be expressed by the display section of the portable terminal By way of example, if the display section can display colors up to 256 colors, it is permitted to reduce the number of colors to 256 and not permitted to reduce the number of colors to less than 256. Due to this, the color number threshold value is set at 8 bits (256). If the number of colors used in the image data is higher than the color number threshold value, the processing moves to a step S307. In the step S307, the number of colors in the pallet of the image data is reduced to thereby reduce the pallet. It is assumed that in the color reduction processing, a pallet is converted into a pallet having the second largest number of colors to that of the pallet before reduction.

In a step S309 following the step S307, the image data is updated based on the reduced pallet.

On the other hand, if it is determined in the step S306 that the number of colors used in the image data is smaller than the threshold value, the processing moves to a step S306. In the step S306, the control section 3 determines whether or not the image size of the image data is larger than an image size threshold value. As the image size threshold value, the number of dots of the image in vertical direction and the number of dots of the image in horizontal direction are preset as internal information on the portable terminal. To prevent the image size from being considerably reduce, it is desirable to set the threshold value to correspond to about a size which can be displayed by the display section of the portable terminal without scrawling The image size threshold value may be, in particular, the number of vertical and horizontal dots of the display section of the portable terminal.

If the size of the acquired image is larger than the image size threshold value, the processing moves to a step S308. In the step S308, the image data is resized. Further, in a step S310, the image data is updated to the resized image data. Next, in a step S311, it is determined whether or not the updated data size is smaller than the size of the designated storage frame in the memory region.

On the other hand, the size of the acquired image data is smaller than the image size threshold value, the processing moves to a step S313. In the step S313, it is determined that the image data cannot be registered or stored, the data is abandoned, the display section 5 displays storage error and all the processings are finished (END).

Next, in a step S311, the control section 3 determines whether or not the data size updated in the step S309 or S310 is smaller than the size of the designated storage frame in the memory region. If the updated data size is smaller than the size of the designated storage frame in the memory region, the processing moves to the step S312. In the step S312, the control section 3 registers the image data in the storage section 4 and the display section 5 displays that the storage has been normally completed.

On the other hand, if it is determined that the updated data size is larger than the size of the designated storage frame in the memory region, the processing returns to the step S304. In the step S304, the control section 3 refers again to the pallet information and the image size information on the image data and determines whether or not the number of colors in the pallet of the image data can be reduced.

In this way, by repeating the color and size reductions, the image data is registered in the storage section 4.

What is claimed is:

1. An image data storage method using a portable terminal including display means for displaying an image and a memory storing image data, said memory including a plurality of image data storage frames each having an equal storage capacity, which comprises the steps of:

determining whether the image data acquired by said portable terminal is larger than each of said storage frames;

determining whether the number of pallet colors of said image data is larger than a predetermined threshold value if said image data is larger than said storage frame;

reducing the number of pallet colors of said image data if the number of pallet colors of said image data is larger than the predetermined threshold value; and updating said image data based on said color-reduced pallets, wherein if a size of said updated image data is equal to or smaller than said storage capacity, the updated image data is registered or stored in said storage frames.

2. The image data storage method according to claim 1 using a portable terminal including display means for displaying an image and a memory storing image data, said memory including a plurality of image data storage frames each having an equal storage capacity, which comprises the steps of:

determining whether the number of vertical and horizontal dots of said image data is larger than a predetermined image size threshold value if the number of pallet colors of the image data acquired by said portable terminal is equal to or smaller than a predetermined threshold value; and changing the number of the vertical and horizontal dots of said image data and updating said image data if the number of the vertical and horizontal dots of said image data is larger than the predetermined image size threshold value, wherein if said image data updated by changing the number of the vertical and horizontal dots of said image data is equal to or smaller than said storage capacity, the updated image data is stored in said storage frames.

3. An image data storage method using a portable terminal including display means for displaying an image and a memory including a storage region storing image data and a temporary region temporarily storing the image data, which comprises the steps of:

determining whether the image data acquired by said portable terminal is larger than a capacity of a vacant region of said storage region;

determining whether the number of pallet colors of said image data is larger than a predetermined threshold value if the image data acquired by said portable terminal is larger than a capacity of a vacant region of said storage region;

storing the image data acquired by said portable terminal in said temporary region if the number of pallet colors of said image data is equal to or smaller than the predetermined threshold value; and reducing the number of pallet colors of other image data stored in said storage region, and increasing the storage capacity of said vacant region, wherein if the image data stored in said temporary region becomes equal to or smaller than the capacity of said vacant region, the image data is registered or stored in said vacant region of said storage region.

4. The image data storage method according to claim 3, wherein if the image data stored in said temporary region is larger than an entire storage capacity of said storage region, the image data is abandoned.

5. The image data storage method according to claim 2, wherein said predetermined image size threshold value is equal to the number of vertical and horizontal dots of said display means.

6. The image data storage method according to 1, characterized in that said predetermined color number threshold value is equal to the number of pallet colors of said display means.

7. The image data storage method according to 3, characterized in that said predetermined color number threshold value is equal to the number of pallet colors of said display means.

* * * * *